United States Patent [19]

Papadopoulos

[11] Patent Number: 5,146,227
[45] Date of Patent: Sep. 8, 1992

[54] SWEEPING RECEIVER

[75] Inventor: Costas Papadopoulos, Acton, Mass.

[73] Assignee: Whistler Corporation, Westford, Mass.

[21] Appl. No.: 695,590

[22] Filed: May 3, 1991

[51] Int. Cl.$^5$ .................. G01S 7/285; G01R 23/14
[52] U.S. Cl. ........................ 342/20; 324/77 CS; 455/147; 342/192
[58] Field of Search .............. 342/20, 192, 98, 100; 324/77 C, 77 CS, 77 B; 455/145-148

[56] References Cited

U.S. PATENT DOCUMENTS

| | | | |
|---|---|---|---|
| 2,502,294 | 3/1950 | Wallace | 250/20 |
| 2,502,295 | 3/1950 | Wallace | 455/147 |
| 2,507,525 | 5/1950 | Hurvitz | 250/20 |
| 3,060,427 | 10/1962 | Jaffe et al. | 343/118 |
| 3,186,349 | 1/1980 | Gordy et al. | 325/323 |
| 3,701,949 | 10/1972 | Turkish | 455/147 |
| 3,794,925 | 2/1974 | Imazeki | 325/470 |
| 3,936,751 | 2/1976 | Holmes et al. | 325/347 |
| 3,946,148 | 3/1976 | Skerlos | 178/5.8 |
| 4,017,798 | 4/1977 | Gordy et al. | 325/42 |
| 4,039,749 | 8/1977 | Gordy et al. | 178/69.1 |
| 4,053,889 | 10/1977 | Johnson | 343/17.2 |
| 4,054,841 | 10/1977 | Henaff et al. | 329/118 |
| 4,114,116 | 9/1978 | Reeder | 333/30 R |
| 4,186,349 | 1/1980 | Gordy et al. | 325/323 |
| 4,207,545 | 6/1980 | Grudkowski et al. | 333/150 |
| 4,210,900 | 7/1980 | Shavit | 340/149 |
| 4,247,903 | 1/1981 | Grudkowski et al. | 364/821 |
| 4,291,409 | 9/1981 | Weinberg et al. | 375/1 |
| 4,300,235 | 11/1981 | Outram | 375/1 |
| 4,305,156 | 12/1981 | Ito et al. | 455/170 |
| 4,305,158 | 12/1981 | Fujishima et al. | 455/187 |
| 4,308,552 | 12/1981 | Hosoya | 358/39 |
| 4,312,228 | 1/1982 | Wohltjen | 73/597 |
| 4,313,216 | 1/1982 | Jaeger et al. | 455/226 |
| 4,408,347 | 10/1983 | Ash | 455/179 |
| 4,408,348 | 10/1983 | Theriault | 455/180 |
| 4,425,634 | 1/1984 | Iino et al. | 367/120 |
| 4,443,801 | 4/1984 | Klose et al. | 343/442 |
| 4,581,643 | 4/1986 | Carlson | 358/191.1 |
| 4,583,047 | 4/1986 | LeGoff epouse Henaff | 329/112 |
| 4,584,715 | 4/1986 | Baars et al. | 455/302 |
| 4,660,164 | 4/1987 | Leibowitz | 364/728 |
| 4,663,746 | 5/1987 | DeMaria et al. | 364/119 |
| 4,703,327 | 10/1987 | Rossetti et al. | 342/44 |
| 4,704,737 | 11/1987 | Estrick et al. | 455/226 |
| 4,734,698 | 3/1988 | Nysen et al. | 342/44 |
| 4,737,790 | 4/1988 | Skeie et al. | 342/51 |
| 4,737,930 | 4/1988 | Constant | 364/841 |
| 4,739,290 | 4/1988 | Minarik et al. | 333/152 |
| 4,749,964 | 6/1988 | Ash | 331/107 |
| 4,754,449 | 6/1988 | Crookshanks | 370/70 |
| 4,764,736 | 8/1988 | Usui et al. | 330/294 |
| 4,812,850 | 3/1989 | Gunton et al. | 342/22 |
| 4,887,086 | 12/1989 | Unser et al. | 342/20 |
| 4,890,099 | 12/1989 | Takano | 324/77 B X |
| 4,891,649 | 1/1990 | Labaar et al. | 342/203 |
| 4,906,999 | 3/1990 | Harrah et al. | 342/20 |
| 4,961,206 | 10/1990 | Tomlinson et al. | 375/39 |
| 4,969,159 | 11/1990 | Belcher et al. | 375/1 |

Primary Examiner—Gilberto Barrón, Jr.
Attorney, Agent, or Firm—Weingarten, Schurgin, Gagnebin & Hayes

[57] ABSTRACT

A radar detector including a local oscillator capable of sweeping over a frequency range of sufficient bandwidth to provide a fundamental frequency and, when injected into a multiplier/mixer, harmonics of that fundamental frequency suitable for heterodyning with rf-signals received by an antenna. The heterodyning of the received rf-signals and the local oscillator signal produce an intermediate frequency signal of constant frequency. A sweep controller causes the local oscillator to sweep only through those local oscillator frequencies suitable for heterodyning with those received rf-signals having radio-frequencies which are of interest. The sweep controller causes the sweeping local oscillator not to sweep through those local oscillator frequencies which would heterodyne with received rf-signals that are not of interest.

31 Claims, 5 Drawing Sheets

SWEEPING RECEIVER

FIELD OF THE INVENTION

The invention relates to the field of sweeping microwave receivers.

BACKGROUND OF THE INVENTION

Figure 1:
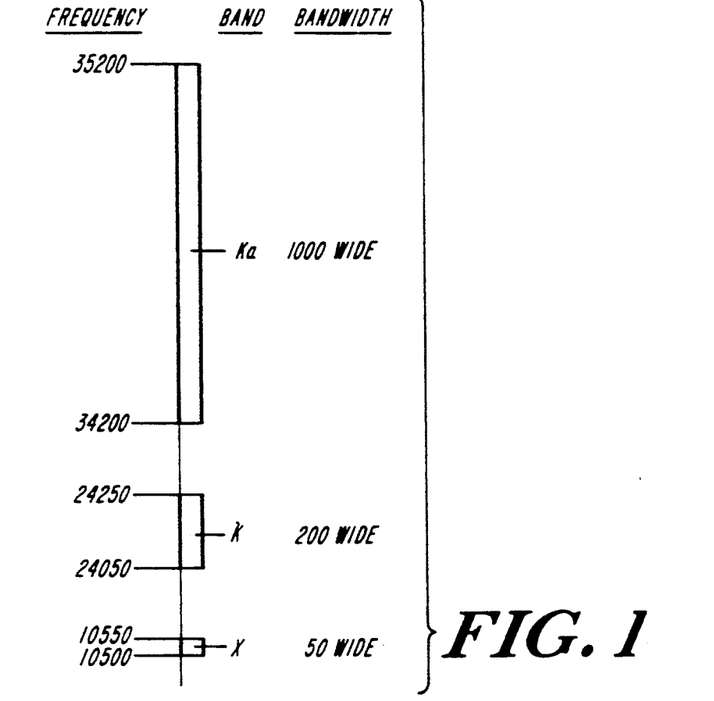
FIG. 1 is a diagram of the radio-frequency spectrum used by speed determining radars.

Referring to FIG. 1, the radio-frequency spectrum utilized in speed-determining radar devices is divided into a series of bands, with each band covering a range of frequencies within the radio-frequency spectrum. The frequencies of interest range from about 10.525 to 35.200 GHz., although all the frequencies within this range are not allocated for speed determining radars. The bands which are allocated for this purpose include: the X-band, which ranges from 10.500–10.550 GHz.; the K-band, which ranges from 24.050–24.250 GHz.; and the Ka band, which presently ranges from 34.200–35.200 GHz.

Radar detectors, used to detect the presence of radar speed detecting devices, must be able to sweep the entire radio-frequency spectrum of interest in a short period of time and yet must also be able to respond accurately to the presence of radio-frequency signals within the bands of interest. A radar detector includes an antenna which receives radiated radio-frequency electromagnetic waves and converts them into conducted radio-frequency electrical signals. These radio-frequency electrical signals are passed to a filter stage which prevents all signals, except those whose frequencies which are of interest, from passing through the filter stage to the detector stage. The detector stage provides the envelope detection useful for carrier detection in a swept receiver.

Since the radio-frequency spectrum of the speed determining radar devices is broad and since the filter stage and the detector stage are most easily constructed for, and most stable over, a narrow range of frequencies, the receiver just described is generally not used. Instead, the typical radar receiver heterodynes, or multiplies the received radio-frequency signal by a second signal, termed a local oscillator or LO signal, of a predetermined frequency, to produce an intermediate frequency or IF signal having a much lower frequency than the radio-frequency or rf signal. This IF-signal is then detected to produce an audio-frequency signal.

In this manner, by varying or sweeping the frequency of the local oscillator signal multiplying the received rf signal, the frequency of the intermediate frequency signal produced can remain constant over a wide range of rf-frequencies. Therefore, the filter stage and the detector stage can be optimized for a narrow band of intermediate frequencies.

In such a heterodyne or superheterodyne receiver, in addition to the above mentioned components, there is also included a sweeping local oscillator and a multiplier. The sweeping local oscillator is typically tunable over a broad frequency range and produces the predetermined local oscillator or LO frequency signal. The multiplier combines or heterodynes this predetermined local oscillator frequency signal with the radio-frequency signal to produce two intermediate frequency signals whose frequencies are the sum and difference of the radio-frequency signal frequency and the local oscillator signal frequency.

Typically, it is the difference intermediate frequency that is desired and the difference frequency is separated from the sum frequency by passing the output signals from the multiplier through a filter to select a filtered intermediate frequency signal. The filtered intermediate frequency signal is then passed to the detector for demodulation.

The radar detector herein disclosed is capable of sweeping all the rf-bands allocated to speed determining radar while reducing the amount of time required to perform the sweep.

SUMMARY OF THE INVENTION

The invention relates to a radar detector which includes a voltage controlled local oscillator. The voltage controlled local oscillator is capable of being swept over a frequency range of sufficient bandwidth to provide a fundamental frequency and, when injected into a mixer/multiplier, harmonics of the fundamental frequency suitable for heterodyning with rf-signals received by an antenna. The act of heterodyning the local oscillator frequency and its harmonics with the rf-signal produces an intermediate frequency signal. A sweep controller causes the voltage controlled local oscillator to sweep only through those local oscillator frequencies suitable for heterodyning with those received rf-signals having radio-frequencies which are of interest. The sweep controller causes the voltage controlled local oscillator not to sweep through those local oscillator frequencies which would be suitable for heterodyning with the received rf-signals that are not of interest.

BRIEF DESCRIPTION OF THE DRAWINGS

These and further benefits of the invention may be better understood with reference to the accompanying specification and the drawings in which.

DESCRIPTION OF THE PREFERRED EMBODIMENT

Figure 2:
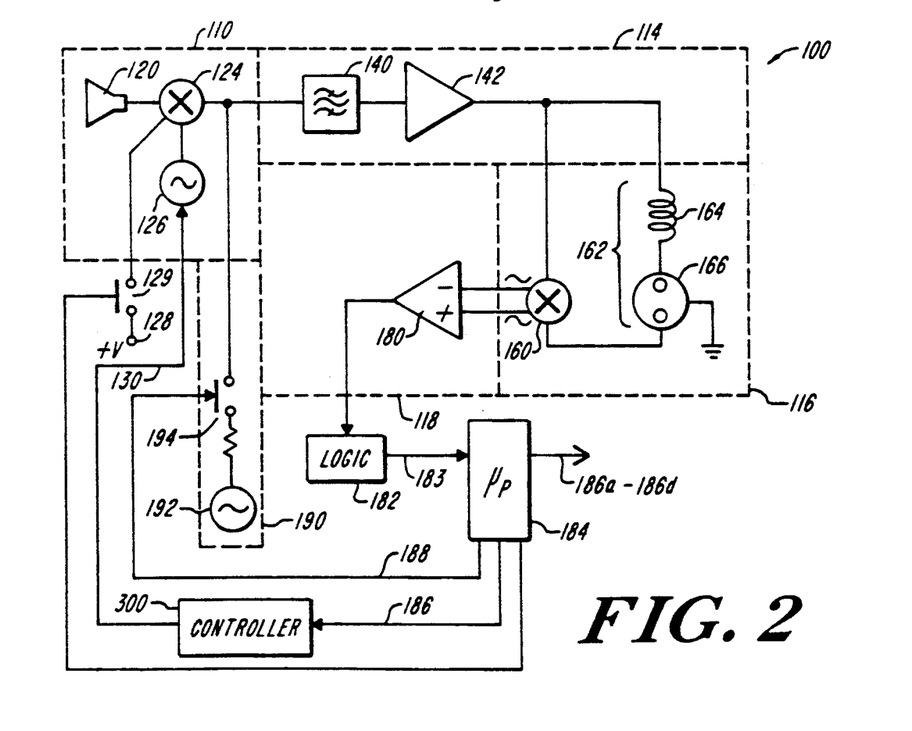
FIG. 2 is a block diagram of an embodiment of a radar detector made in accordance with the invention.

In brief overview, an embodiment of a radar detector 100 made in accordance with the invention is shown in FIG. 2. The radar detector 100 includes a heterodyne front end 110, a calibration stage 190, an intermediate frequency filter amplifier stage 114, a detector stage 116 and a post-detection stage 118.

The heterodyne front end 110 includes a broad-band horn antenna 120, or any other suitable microwave antenna, which receives the radio-frequency electromagnetic radar waves and produces a radio-frequency electrical output signal. The radio-frequency electrical output signal is an input signal to a multiplier/mixer 124. Although the embodiment of the receiver herein described directly connects the horn antenna 120 to the multiplier/mixer 124, other receivers may utilize an rf amplifier, having suitable bandwidth, between the antenna 120 and the multiplier/mixer 124. A voltage controlled local oscillator 126 generates a local oscillator frequency output signal which is a second input signal to the multiplier/mixer 124.

The output signal of the multiplier/mixer 124 of interest is the frequency difference between the frequency of the received radio-frequency signal from the horn antenna 120 and the voltage controlled local oscillator output signal and its harmonics generated by the local oscillator 126. The voltage controlled local oscillator 126 is a variable oscillator and is swept through a range of frequencies. The sweeping of the local oscillator frequency results in the sweeping of the difference frequency generated by the multiplier/mixer 124. When the generated difference frequency sweeps through the bandpass frequencies of the intermediate frequency filter-amplifier stage 114, the difference frequency is passed through to the detector stage 116. The sweeping of the local oscillator 126 is accomplished by varying the voltage applied to the local oscillator 126 by control line 130.

It is possible to sweep the local oscillator across a band of local oscillator frequencies which is much narrower than the band of rf frequencies of interest and still generate a difference frequency signal which will pass through the intermediate frequency filter-amplifier stage 114 and thereby become the intermediate frequency signal which passes through to the detector stage 116. This may be done if, in addition to the fundamental local oscillator frequency, other multiples of the fundamental local oscillator frequency are mixed with the rf-frequencies. For example, in the embodiment shown, the voltage controlled local oscillator 126 is constructed to generate frequencies from 11.94 GHz.–10.88 GHz. while the rf-signals of interest range from 10.5 GHz. to 35.2 GHz. The voltage controlled local oscillator in this embodiment is capable of covering all the radio-frequency bands of interest, which span some 25 GHz., while sweeping only approximately one GHz., because in addition to the fundamental frequency generated by the voltage controlled local oscillator 126, the second and third harmonics of the fundamental are also employed to generate the proper intermediate frequency signal (IF). When determining the range of local oscillator frequencies to be swept, one wishes to choose a range of fundamental frequencies which is wide enough to generate all the harmonics required to cover the rf-bands of interest and yet is narrow enough to be swept quickly. In the embodiment shown, the fundamental frequency of the voltage controlled local oscillator 126, at a central frequency of approximately 10.91 GHz., is used to select the X-band (10.5 GHz.–10.55 GHz.). That is, [10.5 GHz. (rf) +0.3855 GHz. (IF)]through [10.55 GHz. (rf) +0.3855 GHz. (IF)]. The second harmonic of the fundamental at a central frequency of approximately 11.88 GHz. is used to select the K-band (24.05 GHz.–24.25 GHz.). That is, [24.050 GHz. (rf –0.38556 GHz. (IF)]/2 through [24.250 GHz. (rf) 0.3855 GHz. (IF)]/2. The third harmonic of the fundamental at a central frequency of approximately 11.57 GHz. is used to select the Ka-band (34.2 GHz.–35.2 GHz.). That is, [34.2 GHz. (rf) +0.3855 GHz. (IF)]/3 through [35.2 GHz. (rf) –0.3855 GHz. (IF)]/3.

The sweep range of the fundamental from 11.94 GHz. to 10.88 GHz. is sufficient therefore to cause a sweep of the 25 GHz. radio-frequency range of interest. However, further reductions in the local oscillator sweep range are possible and will be discussed below.

The heterodyne front end 110 just discussed, also includes a control line 128 which permits the multiplier/mixer 124 to be used in either a single diode or antiparallel mode. The selection of the single diode or anti-parallel mode also will be further discussed below.

The output signal of the heterodyne front end 110 is the input signal to an intermediate frequency filter-amplifier 114. The intermediate frequency filter-amplifier 114 has a narrow bandpass compared to the frequency of the radio-frequency signal received. The intermediate frequency filter-amplifier 114 includes a bandpass filter 140 and an amplifier 142. Although depicted with a single amplifier 142, the intermediate frequency filter-amplifier 114 is typically constructed as a series of filters and amplifiers to produce a sufficiently high gain to drive the detection stage. In the embodiment herein described, an alternating series of three amplifiers and four LC filters are used to produce a 60 dB gain. The intermediate frequency filter-amplifier 114 is typically fixed, that is, non-tunable. In the present embodiment, the filter passes a central intermediate frequency of 385.5 MHz. It is the ability to tune the voltage controlled local oscillator 126 of the heterodyne front end 110 which permits the intermediate frequency filter-amplifier 114 to be optimized to pass a single band of intermediate frequencies regardless of the frequency of the radio-frequency signals received by the horn antenna 120. The relatively high intermediate frequency (IF) in the single conversion embodiment is preferred because of the absence of image frequencies caused by subsequent conversions. It should be noted however, that although the embodiment disclosed herein utilizes a single conversion receiver, the use of a multiple conversion receiver is also contemplated.

The filtered intermediate frequency output signal from the intermediate frequency filter-amplifier 114 is one input signal to the detection stage 116. That is, the output signal from the intermediate frequency filter-amplifier 114 is one input of a multiplier 160 which forms part of the detection stage 116. The output signal from the intermediate frequency filter-amplifier 114 is also the input signal to a 90 degree phase shifter 162 which forms the remaining portion of the detection stage 116. The phase shifter 162 includes, in one embodiment, a reactive element or elements, such as an inductor 164, connected in series with a surface acoustic wave (SAW) device 166. In the embodiment shown, the SAW device is coupled through the inductor 164 to the signal input. The SAW device may alternatively be coupled to the rest of the circuit, either directly, through AC coupling, or through any other suitable combination of components. The phase shifter 162 produces approximately a 90 degree phase shift in the input signal at approximately the frequency of minimum insertion loss.

In the embodiment shown, the SAW device 166 resonates at approximately the central frequency of the intermediate frequency filter-amplifier stage 114 and has a minimum insertion loss at that frequency. An inductor 164 is used as the reactive element, however, any reactive element or combination of reactive elements may be used. The 90 degree shifted signal formed by the phase shifter 164 is the second input signal to the multiplier 160.

The detector stage 116 of the present embodiment is further discussed in the co-pending U.S. patent application Ser. No. 07/650,950 filed Feb. 5, 1991, and herein incorporated by reference. It should be noted that although the present embodiment utilizes a SAW device, any suitable detector stage which is capable of detecting the intermediate frequency passed by the intermediate frequency filter-amplifier stage 114 may be used. For example, in this embodiment, any stages capable of detecting 385.5 MHz directly or by frequency conversion may be used, i.e., stages performing multiconversions prior to detection.

The multiplier 160 produces two output signals which are opposite in phase. These output signals are the input signals to the post-detection stage 118. In this embodiment the post-detection stage is a differential amplifier 180 which amplifies the difference between the two output signals produced by the multiplier 160 and suppresses common mode signals. The output signal from the differential amplifier 180 is the input signal to logic circuitry 182 which includes a comparator. When an rf-signal is detected, the output of the logic circuitry (comparator) 182 provides a logic one level output to a microprocessor 184.

The microprocessor 184 is employed to control both the sweeping of the frequency of the local oscillator 126 (by means of the voltage on the control line 130) and the overall calibration of the receiver 100.

The calibration of the receiver 100 utilizes a self-calibration stage 190, which includes in one embodiment, a SAW device oscillator 192. A switch 194, under the control of the microprocessor 184, permits the output of the self calibration stage 190 to be applied as an input signal to the multiplier/mixer 124. In this manner, the detection of the known marker frequency signal can be used to calibrate the system. Although a SAW device oscillator 192 is used in the embodiment shown, any other stable high frequency oscillator may be used.

Figure 3:
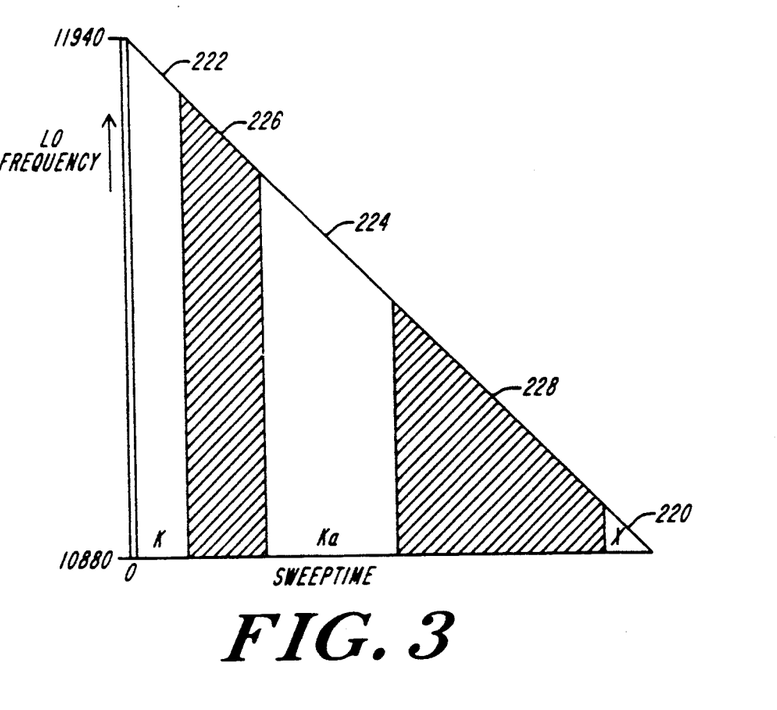
FIG. 3 is a graph showing the local oscillator frequency versus radio-frequency for the embodiment of the local oscillator of the radar detector shown in FIG. 2 without sweep compression.
Figure 3A:
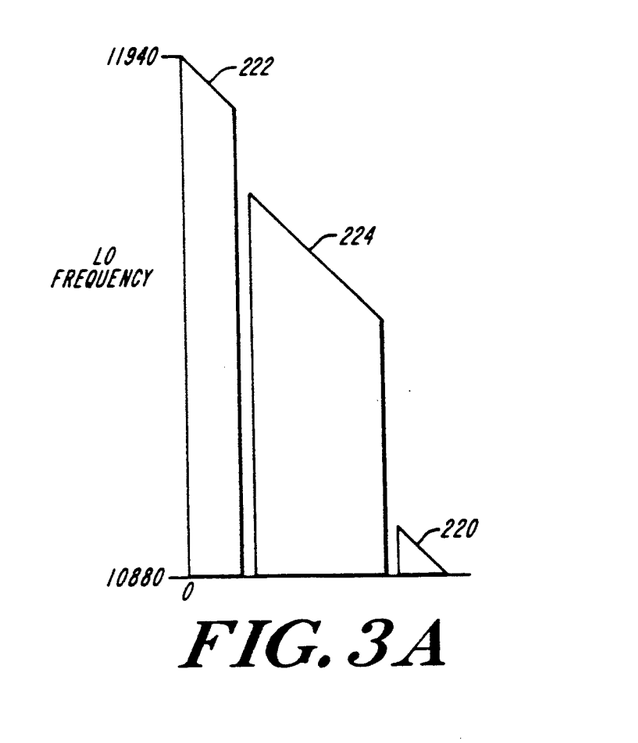
FIG. 3a is a graph showing the local oscillator frequency versus radio-frequency for the embodiment of the local oscillator of the radar detector shown in FIG. 2 with sweep compression.

Having considered each of the components of the receiver 100 in some detail, a method for further reducing the local oscillator frequency sweep range will now be discussed. The result of sweeping the voltage controlled local oscillator 126 in the heterodyne stage 110 from 11.94 GHz. to 10.88 GHz., without additional local oscillator frequency range reduction, is shown in FIGS. 3 and 3a. By sweeping the voltage controlled local oscillator frequencies over 1.06 GHz., not only are the X-band 220, the K-band 222 and the Ka-band 224 swept, but also, wide-frequency bands 226,228 are swept which are not of interest. It is therefore possible to reduce the local oscillator sweep frequency range even further by not sweeping the voltage controlled local oscillator 126 over the local oscillator frequencies which correspond to the rf-frequency bands which are not of interest 226,228. By reducing the frequency range, one is able to thereby reduce the sweep time. This means that the sweep range of the local oscillator 126, which corresponds to the desired frequencies, may be swept more quickly and with a greater repetition rate, therefore reducing response time.

Figure 4:
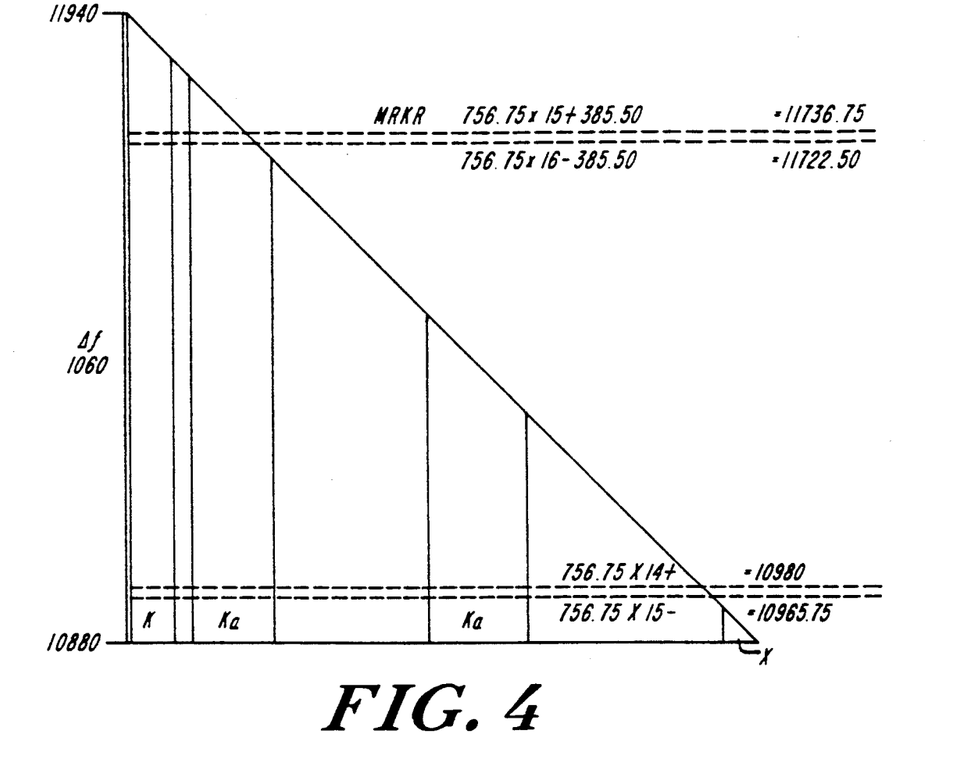
FIG. 4 is a graph showing the local oscillator frequency versus radio-frequency for another embodiment of the local oscillator of the radar detector shown in FIG. 2 without sweep compression.
Figure 4A:
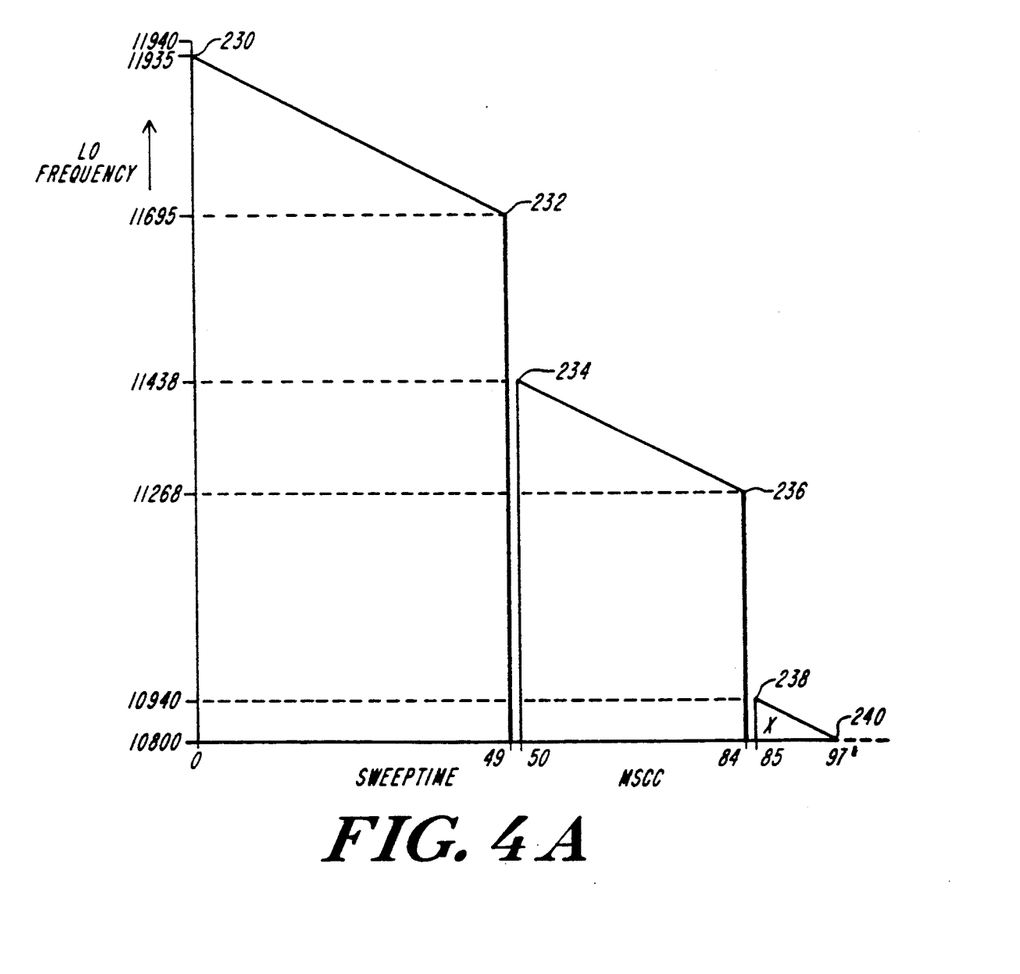
FIG. 4a is a graph showing the local oscillator frequency versus radio-frequency for another embodiment of the local oscillator of the radar detector shown in FIG. 2 with sweep compression.

One way this reduction or compression of the sweep may be accomplished is to switch off the voltage controlled local oscillator when the local oscillator frequency corresponding to the start of the rf-band which is not of interest, is reached. The voltage controlled local oscillator 126 is then switched on again with a voltage applied to the voltage controlled local oscillator 126 set to generate a starting frequency corresponding to the frequency at the beginning of the next rf-band of interest. An example of this method for compressing the sweep is shown in FIGS. 4 and 4a.

At the start of the cycle, the voltage controlled local oscillator 126 is swept 240 MHz. down in frequency from 11.935 GHz. (230) to 11.695 GHz. (232). The voltage controlled local oscillator frequency at 11.695 GHz. corresponds to the frequency at one end of the K-band; that is [24.250 GHz. (rf) −0.3855 GHz. (IF)]/2. Although sweeping the voltage controlled oscillator down to 11.830 GHz. would have covered all the K-band, that is [24.250 GHz. (rf) −0.3855 GHz. (IF)]/2, by sweeping down to 11.695 GHz, a portion of the Ka-band is also swept. At this local oscillator frequency, the voltage across the voltage controlled local oscillator 126 is shunted (232) to ground switching off the voltage controlled local oscillator 126. The voltage controlled local oscillator 126 is then switched on again at a voltage level corresponding to a local oscillator frequency equal to the starting frequency (11.438 GHz.) of the remaining portion of the Ka-band (234). Again the voltage controlled local oscillator is swept down in frequency 170 MHz. until the remaining frequencies of the Ka-band are swept (236). At the end of the Ka-band, (corresponding to a local oscillator frequency of 11.268 GHz.) the voltage controlled local oscillator 126 is again shunted (236) to ground.

The voltage controlled local oscillator 126 is then switched on for a third time at the local oscillator frequency (10.94 GHz.) corresponding the starting frequency of the X-band (238). Again the the voltage controlled local oscillator 126 is then swept down in frequency 60 MHz. (corresponding to a local oscillator frequency of 10.880 GHz.) until the X-band is covered (240).

At this point the voltage controlled local oscillator 126 is grounded again and restarted again at 11.935 GHz for to the start of a new sweep. The sweep cycle is then repeated. By switching off the local oscillator 126 when a band of no-interest is reached, instead of sweeping the local oscillator over the 1.060 GHz. between the local oscillator frequency corresponding to the lowest frequency of the X-band and the local oscillator frequency corresponding to the highest frequency of the K-band, the local oscillator need be swept only over 470 MHz. (That is 240 MHz.+170 MHz.+60 MHz.). This technique allows the complete local oscillator frequency range corresponding to the rf-bands of interest, to be swept in about 97 msec instead of the 219 msec which would be required if the entire local oscillator frequency range were to be swept.

Figure 5:
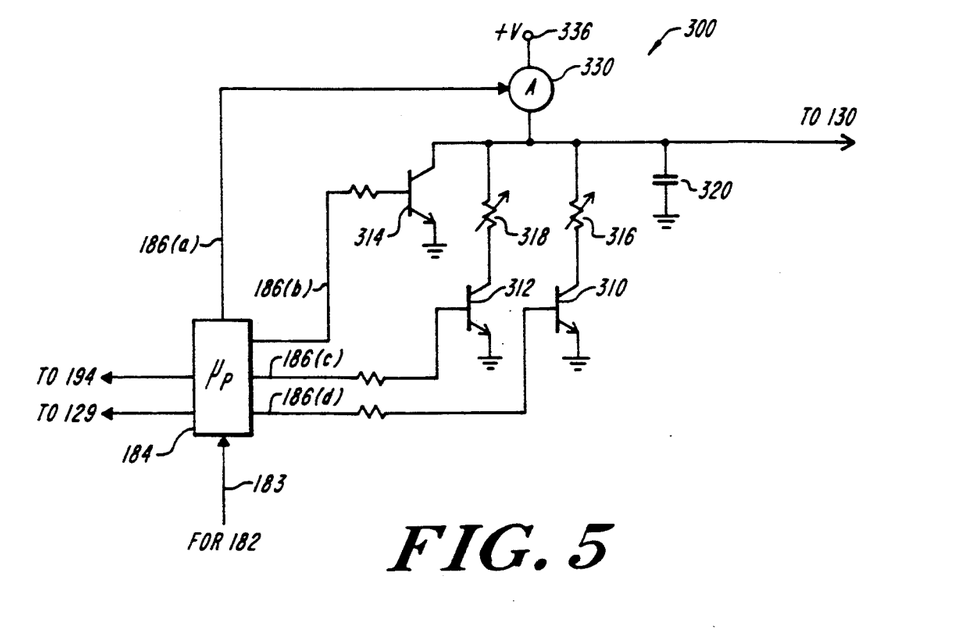
FIG. 5 is a schematic diagram of the sweep controller of the embodiment of the invention shown in FIG. 2.

An embodiment of a controller for controlling the sweep of the voltage controlled local oscillator 126 is shown in FIG. 5. The voltage across a capacitor 320 in the controller 300 determines the output frequency of a voltage controlled local oscillator 126. As shown in FIG. 5, the controller 300 includes three transistors 310, 312, 314 which control the rate at which current is drained from the capacitor 320. The microprocessor 184 controls the switching of the transistors 310, 312, 314. Variable resistors 316, 318 determine the rate of discharge of capacitor 320 when transistors 310, 312, respectively, are switched on. The variable resistor 316 has a lower value than the variable resistor 318 and as such, when transistor 310 is switched on, the capacitor 320 discharges at a more rapid rate than when transistor 312 is switched on. Transistor 314 very rapidly discharges the capacitor 320 since no series resistance or a very low series resistance is employed.

To permit the voltage controlled local oscillator 126 to sweep through the frequencies of interest at the correct rate of sweep, the values of several of the components are adjusted. A first adjustment is made to the current source 330. The current source 330 must provide a sufficient amount of charge on the capacitor 320 so as to produce a voltage on the capacitor 320 to cause the local oscillator 126 to generate a frequency which is slightly higher than the local oscillator frequency which corresponds to the starting frequency of the first rf-band of interest (the K-band in this embodiment). A second adjustment is made to the variable resistors 316,318 so as to produce a fast rate of discharge and a slow rate of discharge of the capacitor 320 to ground when the transistors 310,312, respectively, are switched on.

Once these adjustments have been completed, the system is ready for operation. Typically, in operation, transistor 310, 312 are initially switched off and transistor 314 is initially switched on. The charge on the capacitor 320 is discharged which causes the voltage on the voltage controlled oscillator 126 to be reduced. Transistor 314 is then switched off and the capacitor 320 is allowed to charge to a predetermined voltage. The voltage across the capacitor 320 and hence the voltage input to the voltage controlled oscillator 126 is selected to cause the oscillator 126 to output a frequency at approximately 11.94 GHz. Transistor 312 is then switched on and the charge on the capacitor 320 is drained. As charge is drained, the voltage across the capacitor 320 and hence the input to the voltage controlled local oscillator 126 decreases. The decrease in voltage causes the frequency generated by the voltage controlled oscillator 126 to decrease. The rate of drain of the charge determines the rate at which the frequency of the oscillator 126 changes or sweeps. When a predetermined amount of charge has been drained, the voltage across the voltage controlled local oscillator 126 is such that the frequency generated by the voltage controlled local oscillator 126 corresponds to the end of the first rf-band of interest (232) (FIG. 4a).

Transistor 312 is then switched off and transistor 314 is switched on again and the capacitor 320 is discharged. This causes the voltage across the capacitor 320 and hence the voltage controlled local oscillator 126 to go to zero. Transistor 314 is then switched off, and the capacitor 320 is allowed to charge to a voltage which causes the voltage controlled local oscillator 126 to generate an output frequency corresponding to the start of the next rf-band of interest. Transistor 312 is next switched on and the charge on the capacitor 320 is again allowed to discharge. This causes the voltage across the capacitor 320 to decrease and the frequency generated by the voltage controlled local oscillator 126 to decrease.

The voltage across the capacitor 320 decreases until the local oscillator frequency corresponds to a frequency at the end of the rf-band of interest. At that time, transistor 312 is switched off and transistor 314 is again switched on, thereby permitting the remaining charge on the capacitor 320 to be discharged to ground. The transistor 314 is then switched off and the capacitor 320 is then allowed to charge to a voltage which produces a local oscillator frequency corresponding to the next rf-band of interest. Once again transistor 312 is switched on, permitting the capacitor 320 to discharge. Once the voltage controlled local oscillator frequency reaches a frequency corresponding to the frequency at the end of the rf-band of interest, transistor 312 is again switched off while transistor 314 is again switched on, draining the capacitor 320 to ground. Transistor 314 is then switched off and the capacitor 320 allowed to charge to a voltage which cause the voltage controlled local oscillator 126 to output a frequency at approximately 11.94 GHz., again corresponding to the start of the first rf-band of interest. At this point the cycle is repeated.

A remaining step in the detection of a radar signal is the determination that the received rf-signal, in fact, belongs to the X-band, K-band or Ka-band, and is not an rf-signal from outside these bands that has been passed as a result of the heterodyning process i.e., unwanted image frequencies.

Figure 6:
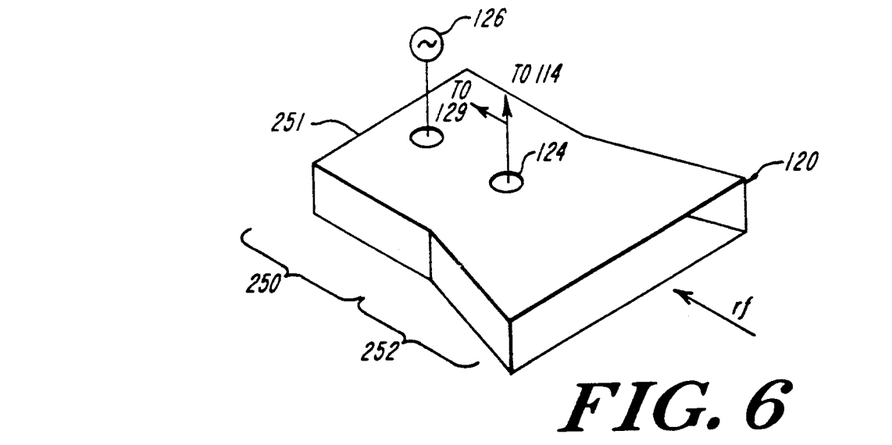
FIG. 6 is a perspective view of the horn antenna of the embodiment of the invention shown in FIG. 2.

In order to understand how this determination can be accomplished, the heterodyne stage 110 will now be considered in more detail. Referring to FIG. 6, the horn antenna 120 of the embodiment includes a backshort section 250 which is positioned adjacent the "horn" portion 252 through which rf radiation enters the horn antenna 120. Positioned in front of the backshort section 250 is the multiplier/mixer 124. The output of the multiplier/mixer 124 is the input to the intermediate filter-amplifier stage 114. In the rear portion of the backshort section 250 is the input terminal for the local oscillator 126. Standing waves are setup in the space between the multiplier/mixer 124 and the backshort 251 of the backshort section 250. The distance between the backshort 251 and the multiplier/mixer 124 is selected to be approximately equal to odd multiples of a quarter wavelength of the frequencies to be detected.

Figure 7:
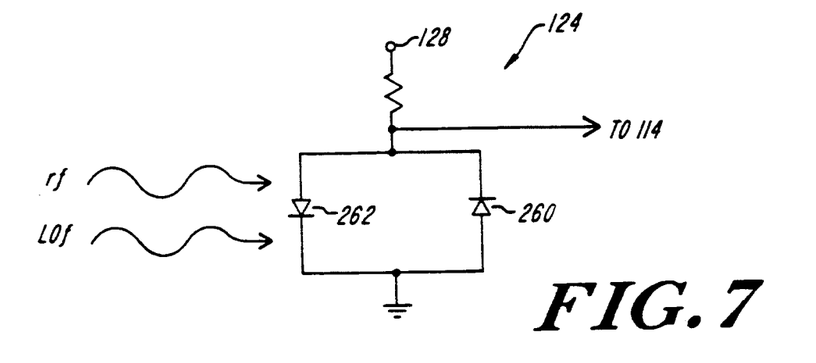
FIG. 7 is a schematic diagram of the multiplier/mixer of the embodiment of the invention shown in FIG. 2.
Figure 7A:
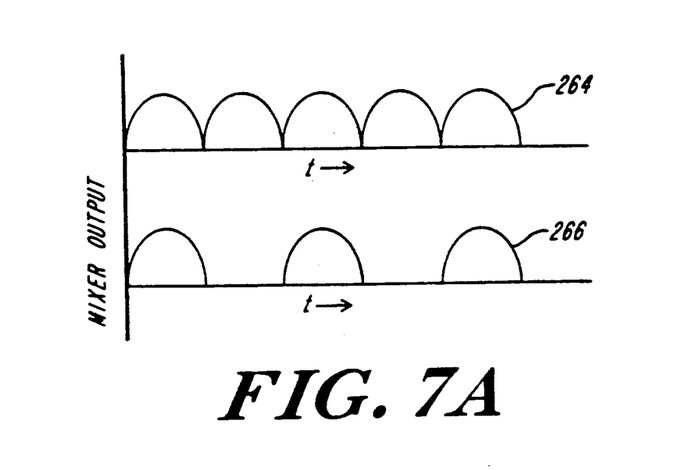
FIG. 7a are the waveform diagrams of the output signal from the multiplier/mixer of the embodiment shown in FIG. 6.

The multiplier/mixer 124 includes a pair of diodes 260,262 connected in an anti-parallel configuration (FIG. 7). One side of the pair of diodes 260,262 is connected to ground while the other side of the pair of diodes 260,262 is connected to the input terminal of the intermediate frequency filter-amplifier 114. The side of the diode pair 260,262 which is connected to the input terminal of the intermediate frequency filter-amplifier 114 is also switchably connected to a bias voltage 128. The switch 129 which permits the bias voltage to be applied to the diode pair is controlled by the microprocessor 184. Rf and Lo-radiation, guided to the diodes 260,262, is converted into radio-frequency electrical signals which are the input signals to the intermediate frequency filter amplifier 114. When both diodes 260,264 are able to conduct i.e. unbiased, the Lo-radiation causes each diode 260,262 to conduct when the Lo-radiation biases the diode 260,262 in the forward direction. Since the diodes 260,262 are arranged antiparallel, each diode 260,262 conducts during one half of the Lo-radiation waveform. In this way the Lo-radiation is full-wave rectified. That is, the diodes 262, 260, conducting in each direction from a mixer which is twice as effective in converting rf-radiation to the intermediate frequency (IF). The waveform 264 resulting from full-wave rectification is shown in FIG. 7a. When a positive voltage 128 is applied to the voltage bias control line by the switching on of the switch 129 by the microprocessor 184, one of the diodes 260 is always biased off while the other 262 is biased on. However, the voltage which biases the diodes 260,262, is of such a magnitude that diode 262, which is biased on, is capable of being switched off by the incident Lo-radiation and only conducting on every half wavecycle. The result is that the Lo-radiation is half-wave rectified. The waveform 266 resulting from this half wave rectification is shown in FIG. 7a. Full-wave rectification will detect even harmoics of the fundamental Lo-frequency while half-wave rectification is used in detecting all harmonics. It should be noted that an embodiment using a single diode would be capable of detecting all harmonics but would not have enhanced performance at even harmonics.

The process by which an rf-signal is determined to be from within an rf-band of interest is dependent upon from which rf-band of interest the signal appears to originate. The microprocessor 184 is able to determine from which band the signal arises by keeping track of the voltage across, and hence the frequency of, the local oscillator 126. The microprocessor 184 is able to determine this voltage by knowing the decay rate of the voltage on the capacitor 320 and the transistor switch 310, 312, 314 which was enabled. When a signal is detected, the logic circuitry 182 changes the state of an input line 183 connected to the microprocessor 184. When this change of state is detected by the microprocessor 184, the present local oscillator frequency is calculated from the discharge history of capacitor 320 using the microprocessor's internal clock as a reference. The voltage on the local oscillator 126, and hence the local oscillator frequency, is then changed by the microprocessor 184 as set forth below so as to determine the nature of the rf-signal received.

If the rf-signal appears to originate at a frequency that is within the Ka-band, the local oscillator frequency is adjusted by the microprocessor 184 ro a value below the apparent frequency by an amount equal to twice the intermediate frequency divided by three. That is, the new local oscillator frequency is equal to the local oscillator frequency at which the signal was detected —[2×0.3855 GHz. (IF)]/3]. This may be accomplished by switching on transistor 312 to provide a rapid decay of the voltage across the capacitor 320. If the received rf-signal is still detected at this new local oscillator frequency, as indicated by the state of the input line 183, then the signal is a valid Ka-band rf-signal. It is also acceptable to increase the voltage on the local oscillator 126 to bring the new local oscillator frequency to a value which is equal to the local oscillator frequency at which the signal was detected+[(2×0.3855 GHz. (IF)]/3], and if the signal again is present, then the signal is a valid Ka-band rf-signal.

If the rf-signal appears to originate in the X-band, the technique is to rule out the presence of an interfering rf-signal at 11.3 GHz, which is typically the strongest interfering signal in this region of the rf-spectrum. To determine if the signal is from an 11.3 GHz. source, the voltage on the local oscillator 126 is adjusted to produce a local oscillator frequency of 11.7 GHz. 11.3 GHz. (rf)+0.3855 GHz. (IF)]. If the rf-signal is still present at this new local oscillator frequency, the rf-signal does not originate from the X-band.

To determine if a signal appears to originate in the K-band, the microprocessor 184 enables switch 129 thereby applying the bias voltage 128 to the diodes 260, 262. If the signal is not present when the diodes 260, 262 are in the anti-parallel mode, then the signal originate in the K-band. If the signal is present in the anti-parallel mode, then the presence of an out-of-band signal cannot be eliminated immediately, but the sweep frequency may be directed to a frequency which is lower by (2×0.385 (IF))/2 to search for the unwanted microwave image frequency. If a signal is still present, it is not from the radar K-band.

To ensure that the frequencies generated by the local oscillator 126 do in fact correspond to the rf-frequencies of interest, the system performs a self-calibration. When self-calibrating, a marker frequency is generated by a SAW device oscillator 192 within the calibration stage 190.

A SAW device oscillator 192 is very stable but typically does not function above about 1 GHz. However, by using a lower frequency SAW device oscillator 192, it is possible to generate several marker frequencies in the radar spectrum by using the harmonics generated when the signal from the SAW device oscillator 192 is heterodyned with the local oscillator signal. A switch 194, under the control of the microprocessor 184 permits the signal to enter the multiplier 124 and be mixed with the signal from the local oscillator 126.

By setting the local oscillator frequency to detect the 15th harmonic produced by a 756.75 MHz SAW device oscillator, (i.e., 756.75 MHz×15+385.5 MHz) an upper marker is generated at 11.73675 GHz, near the frequency at the start of the sweep. Similarly, setting the local oscillator frequency so as to detect the 14th harmonic of a 756.75 MHz SAW device oscillator generates lower marker at about 10.98 GHz, near the frequency at the end of the sweep. Alternatively, or in addition to the markers discussed, the 16th harmonic could be used to generate an upper marker at 11.7225 GHz and the 15th harmonic could be used to generate a lower marker at 10.96575 GHz. The presence of at least two markers not only defines the marker frequencies, but also provides a means for determining the actual rate of sweep versus the anticipated rate of sweep. Once the actual sweep rate is known, the microprocessor 184 can compensate for the deviation of the actual sweep rate from the desired sweep rate, as well as the deviation of the anticipated local oscillator frequencies from the actual local oscillator frequencies.

In operation, the capacitor 320 is allowed to charge for a fixed period of time and the transistor 312 is then switched on, permitting the capacitor 320 to discharge. The marker is detected and the difference between the measured local oscillator frequency at which the marker was detected and the anticipated local oscillator frequency at which the marker should have been detected is determined. This difference determines whether the amount of charge on the capacitor should be greater or lesser. The amount of charge is then adjusted, the marker detected, and the frequency difference measured again. This cycle of measurement and adjustment is repeated until the difference between the measured marker frequency and the nominal marker frequency reaches a predetermined value.

It is understood that other modifications or embodiments are possible which will still be within the scope of the appended claims. These and other examples of the concept of the invention illustrated above are intended by way of example and the actual scope of the invention is to be determined solely from the following claims.

What is claimed is:

1. A radar detector comprising:
   a tunable local oscillator for sweeping a first frequency band of interest between a first frequency and a second frequency and for sweeping second frequency band of intersect between a fourth frequency and a fifth frequency; and
   a sweep controller for setting said tunable local oscillator to a third frequency, subsequent to said sweeping of said fist frequency band of interest and prior to said sweeping of said second frequency band of interest,
   wherein said first frequency band and said second frequency band are non-overlapping, and
   wherein said third frequency is a frequency outside the range of frequencies between said list frequency and said fifth frequency.

2. A radar detector comprising:
   a tunable local oscillator capable of sweeping between an initial frequency and a final frequency to produce a local oscillator frequency sweep;
   a multiplier/mixer for multiplying said local oscillator frequency sweep by a received rf-signal;
   a sweep controller for interrupting the local oscillator frequency sweep at at least one frequency and restarting said frequency sweep at another predefined frequency to reduce the time to sweep desired frequencies between said initial frequency and final frequency; and
   a calibration stage for producing at least one rf-frequency signal marker suitable for heterodyning wit the signal from the local oscillator to produce a detected signal at a predetermined frequency.

3. The radar receiver of claim 2 wherein said calibration stage comprises a SAW-device oscillator.

4. The radar receiver of claim 3 wherein said SAW-device oscillator produces at least one harmonic frequency suitable for use as said rf-frequency signal a marker.

5. The radar receiver of claim 2 further comprising a microprocessor, said microprocessor controlling the calibration stage.

6. The radar receiver of claim 5 wherein said microprocessor detects said rf-frequency signal marker to determine the frequency produced by the local oscillator and the rate at which the local oscillator frequency is changing.

7. The radar receiver of claim 1 wherein said tunable local oscillator is a voltage controlled oscillator.

8. The radar receiver of c 7 wherein said sweep controller causes said voltage controlled oscillator not to sweep by maintaining a constant voltage on said voltage controlled oscillator.

9. A radar detector comprising:
   a tunable local oscillator capable of sweeping between an initial frequency and a final frequency to produce a local oscillator frequency sweep;
   a multiplier/mixer for multiplying said local oscillator frequency sweep by a received rf-signal; and
   a sweep controller for interrupting the local oscillator frequency sweep at least one frequency and restarting said frequency sweep at another predefined frequency to reduce the time to sweep desired frequencies between said initial frequency and final frequency,
   wherein said tunable local oscillator is a voltage controlled oscillator,
   wherein said sweep controller causes said voltage controlled oscillator not to sweep by maintaining a constant voltage on said voltage controlled oscillator, and
   wherein said sweep controller comprises:
   a capacitor for providing said voltage to said voltage controlled oscillator; and
   a plurality of switch controlled resistors connected in parallel with said capacitor.

10. The radar receiver of claim 9 wherein said plurality of switch controlled resistors determine the rate of discharge of said capacitor.

11. The radar receiver o claim 10 wherein said switches are controlled by a microprocessor so as to control the frequency generated by said local oscillator.

12. A method for detecting radar rf-signals with a receiver having a tunable local oscillator, said method comprising the steps of:
   a. sweeping a first band of interest with said tunable local oscillator between a fist frequency and a second frequency;
   setting said tunable local oscillator to a third frequency; and
   sweeping a second frequency band of interest with said tunable local oscillator between a fourth frequency and a fifth frequency,
   wherein said first frequency band and said second frequency band are non-overlapping,
   and wherein said third frequency is outside the range of frequencies between said fist frequency and said fifth frequency.

13. The radar receiver of claim 1 further comprising a calibration oscillator for producing at least one ef-frequency signal marker suitable for heterodyning with the signal from the local oscillator to produce a detected signal a a predetermined frequency.

14. The radar receiver of claim 13 wherein said calibration oscillator comprises a SAW-device oscillator.

15. The radar receiver of claim 13 wherein said calibration oscillator produces at least on harmonic frequency suitable for use as said rf-frequency signal marker.

16. The radar receiver of claim 13 further comprising a microprocessor, said microprocessor controlling the calibration oscillator.

17. The radar receiver of claim 16 wherein said microprocessor detects said rf-frequency signal marker to modify the rate at which the local oscillator frequency is changing.

18. The radar receiver of claim 13 wherein said sweep controller uses said rf-frequency signal marker to control said tunable local oscillator so as to maintain said rf-frequency signal marker at a predetermined location within said frequency bands of interest.

19. The radar receiver of claim 1 wherein said tunable local oscillator is a voltage controlled oscillator.

20. The radar receiver of claim 19 wherein said sweep controller causes said voltage controlled oscillator not to sweep by maintaining a constant voltage on said voltage controlled oscillator.

21. The radar receiver of claim 20 wherein said sweep controller comprises:
   a capacitor for providing said voltage to said voltage controlled oscillator; and
   a plurality of switch controlled resistors connected in parallel with said capacitor.

22. The radar receiver of claim 21 wherein said plurality of switch controlled resistors determine the rate of discharge of said capacitor.

23. The radar receiver of claim 22 wherein said switches are controlled by a microprocessor so as to control the frequency generated by said local oscillator.

24. A radar detector comprising:
   a controllable oscillator having a control input and a frequency output responsive to said control input,
   said controllable oscillator for sweeping a first frequency band of interest between a fist frequency and a second frequency in response to varying the value of said control input between a first value and a second value, and for sweeping a second frequency band of interest between a fourth frequency and a fifth frequency in response to varying said value of said control input between a fourth value and a fifth value; and
   a control circuit for setting said value of said control input to a third value, subsequent to said varying said value of said control input between said first value and said second value and prior to said varying said value of said control input between said fourth value and said fifth value,
   wherein the values of said control input between said first value and said second value and between said fourth value and fifth value to not overlap,
   wherein said third value of said control input is outside the range of values between said list value and said fifth value.

25. A radar detector comprising:
   a controllable oscillation circuit for sweeping a first frequency band of interest between sag first frequency and as second frequency and for sweeping a second frequency band of interest between a fourth frequency and a fifth frequency; and
   a sweep controller for setting said controllable oscillation circuit to a third frequency, subsequent to said sweeping of said first frequency band of interest and prior to said sweeping of said second frequency band of interest,
   wherein said first frequency band and said second frequency band are non-overlapping, and
   wherein said third frequency is a frequency outside the range of frequencies between said first frequency and said fifth frequency.

26. The radar detector of claim 25 wherein said controllable oscillation circuit comprises a tunable local oscillator.

27. The radar detector of claim 1 further comprising a multiplier/mixer for multiplying said tunable local oscillator frequency by a received rf-signal.

28. A radar detector comprising:
   a tunable local oscillator for sweeping a first frequency band of interest between a first frequency and a second frequency at a first rate, and for sweeping a second frequency band of interest between a fourth frequency and a fifth frequency at a second rate; and
   a sweep controller for setting said tunable local oscillator to a third frequency, subsequent to said sweeping of said first frequency band of interest and prior to said sweeping of said second frequency band of interest,
   wherein said first frequency band as said second frequency band are non-overlapping, and
   wherein said third frequency is a frequency outside the range of frequencies between said first frequency and said fifth frequency.

29. The radar detector of claim 28 wherein said first rate and said second rate are substantially equal.

30. The radar detector of claim 28 wherein said fist rate and said second rate are not substantially equal.

31. The radar detector of claim 27 wherein said tunable local oscillator is adapted for sweeping at lest one additional frequency band of interest between a beginning frequency and an ending frequency, each said additional band being swept at a selected rate,
   wherein said sweep controller is adapted for setting said tunable local oscillator to said third frequency, subsequent to said sweeping of said second frequency band of interest and prior to said sweeping of said each additional frequency band of interest,
   wherein all said frequency bands of interest are non-overlapping, and
   wherein said third frequency is a frequency outside the range of frequencies of all said frequency bands of interest.

* * * * *